United States Patent Office 3,031,379
Patented Apr. 24, 1962

3,031,379
CONVERSION OF STEROIDS WITH MOLD SPORES
Stanley G. Knight, Madison, Wis., assignor to Wisconsin Alumni Research Foundation, Madison, Wis., a corporation of Wisconsin
No Drawing. Filed Mar. 19, 1959, Ser. No. 800,393
7 Claims. (Cl. 195—51)

The present invention relates to the microbiological production of chemical compounds by spores produced during fermentation, and more specifically to the improvement which consists in the production of the compounds with the spores substantially free from vegetative growth material, e.g. mycelium, produced during fermentation and in a substantially nutrient-free aqueous medium. The process is particularly adaptable for the introduction of oxygen into steroids or into intermediates thereof.

Heretofore, microbiological production of chemical compounds of the steroid type has been carried out for the most part in a fermentation medium containing nutrients such as cornsteep liquor, soybean meal and the like, along with molasses, sucrose, etc. to provide assimilable sources of both nitrogen and carbon, and in the presence of the resulting mycelium and beer produced during fermentation. See Fried et al. Patent 2,753,290 and Thoma et al. Patent 2,793,162. The microbiological production of compounds of the steroid type has also been carried out using both the mycelium alone and the beer alone. The use of a supernatant fluid obtained from chopped myselium has also been proposed. See Murray et al. Patent 2,602,769 and particularly Example 18 in columns 33–34 of the Murray et al. patent. As pointed out in this example, the supernatant (S11) gave considerable conversion, the beer (BF) gave better conversion and the mycelium residue gave complete conversion. The so-called "oxygenating activity" responsible for conversion was known to involve enzymes and, as shown by the Murray et al. patent, supra, the enzymes produced during fermentation were also known to be associated with both the mycelium and the beer.

Recovery of the modified chemicals (converted steroids) from a complex fermented medium obviously posed problems. Recovery in good yields either from the vegetative growth containing mycelium or from the beer containing organic nutrients, both of which are contaminated with by-products of fermentation, also posed problems. In view of this the art has been searching for improved recovery (e.g. extraction) procedures as well as means for carrying out the conversion with the oxygenating enzymes free from both mycelium and beer. As for the latter, no satisfactory enzyme extract has been reported which provides adequate conversion and as a result of this art, in commercial operations, either uses the complete fermented medium containing both mycelium and beer or the mycelium alone or beer alone obtained by filtration of the fermented medium.

In the copending Knight application Serial No. 760,840, filed September 15, 1958, of which the present application is a continuation-in-part, it is pointed out that investigations of the conversion of fats, e.g. milk fat, to highly flavored ketones, by molds of the Penicillium type, appeared initially to confirm what long had been assumed, that spores per se, compared to the metabolically very active strong, young mycelium cells, were substantially inactive, i.e. relatively inert or dormant. In the Knight application, supra, it is also pointed out that this assumption proved to be incorrect in that, after the fat had been subjected to fat splitting enzymes, the spores per se were unexpectedly found to convert the resulting free fatty acids to ketones in a matter of a few hours. See Gehrig and Knight, Nature, page 1237, November 1, 1958. This discovery of spore activity led to the further discovery that spores free from the fermented medium, including both mycelium and beer, could be used as such to modify chemicals and specifically to introduce oxygen into steroid type molecules.

The spores used in the present invention can be readily obtained from vegetative cells (mycelium) which have been allowed to grow for 4–6 days in submerged culture with aeration (e.g. shaking) in an aqueous cornsteep liquor-lactose or other nutrient medium providing assimilable carbon and nitrogen in accordance with standard practices in the art. The spores produced by the old vegetative cells are harvested by first straining through cheesecloth to remove most of the mycelium and then by filtering through glass wool to remove the remaining mycelium. The spores in the filtrates are recovered by centrifuging and are then washed with water to remove any retained nutrients. They may be stored in dry form or resuspended in distilled water and be kept at 4° C. The suspension can be standardized to contain, for example, about one billion spores/ml. The spores can also be grown on surface culture, e.g. nutrient agar, and after scraping off the spores and suspending in water, the spores can be recovered in substantially pure form by filtering, centrifuging, etc., as described above. Surface culture should be used where the organism does not sporulate or sporulate well in submerged culture. The species of fungus of the order Murcorales, e.g. *Rhizopus nigricans*, do not sporulate in submerged culture and spores of this fungus for use in the present invention should therefore be prepared by surface culture as noted above. The best procedure for high spore production, if not known, can be readily ascertained by preliminary test.

The following example will serve to illustrate the invention.

*Example*

A glucose-neopeptone nutrient medium (Sabouraud's medium) solidified with 2% agar was first inoculated with *Aspergillus ochraceus* in accordance with standard practices in the art and cultured at about 30° C. for about 5 days. The spores produced during this period were washed off the surface of the resulting vegetative mycelial growth with distilled water. The resulting aqueous suspension, contaminated with some mycelium and nutrient medium, was filtered through glass wool to remove the mycelium along with any insoluble nutrient, and centrifuged to recover the spores. The soluble nutrients in the medium which were retained by the spores was next removed by suspending the spores in distilled water and centrifuging to recover the spores. This washing step (resuspending the spores in distilled water and centrifuging) can be repeated where necessary, or desired, to be sure that the spores are substantially free from all contaminating nutrient material as well as mycelium.

The spores obtained above were suspended in distilled water buffered with about 1% phosphate buffer to pH 6.5–7.0 to provide a suspension containing about 1–10 billion spores per ml. To about 20 ml. of this suspension, in a 125 ml. Erlenmeyer flask, was then added 1 mg. of progesterone dissolved in 1 ml. of propylene glycol. As the glycol is miscible with water and the progesterone is insoluble in water, the progesterone comes out of solution in the form of a fine suspension when added to the buffered aqueous suspension. The resulting spore-progesterone suspension was then aerated by shaking on a rotary shaker, revolving about 150 r.p.m. about a ¼ inch radius, for about 12 hours at about 25° C.

At the end of this period the suspension containing the spores and steroid was extracted with chloroform and the extract centrifuged to remove insoluble material and the aqueous phase from the chloroform. The resulting spore-free clear extract contains the desired 11-alpha hydroxyprogesterone and the steroid was readily recovered by driving off the chloroform under reduced pressure. Examination of the product, identified by comparison with a known true sample of 11-alpha hydroxyprogesterone, disclosed that substantially 100% of the progesterone had been converted to the desired 11-alpha-hydroxy derivative. This shows that the 12-hour conversion period used above was adequate and indicates that still shorter times possibly can be employed to complete the introduction of the hydroxy group into progesterone with spores of *A. ochraceus* in a substantially mycelium-nutrient free medium. In practice the length of time-concentration of spores relationship can be adjusted to fit specific schedules.

For rapid conversion of the steroid by the spores the steroid should be present in fine particle size. This is easily accomplished by dissolving the steroid in an inert water miscible organic solvent such as the lower alcohols (methanol, ethanol, etc.), water miscible glycols, acetone or the like and adding the organic solution to the aqueous suspension of the spores. When this is done, as noted above, the steroid comes out of solution in the desired form as a fine suspension. Recovery of the converted steroid in desired high yield by use of organic solvents in which the steroid is soluble is also readily accomplished due to the absence of vegetative growth (mycelium) and the beer with remaining nutrients as well as the complex by-products formed during fermentation. Of utmost importance, the spores after use can be readily recovered by centrifuging and, preferably after washing with water can be used again if maintained in a medium lacking one or more nutrients which keeps the spores from germinating. The process using spores only and the discovery that they can be used again, represent distinct improvements over the processes described in Murray et al. Patent 2,649,402 and Dulaney et al. Patent 2,802,775.

The process can be carried out using pure oxygen as well as air during the conversion of the steroids. A small amount of KCN (0.65 M) or CO can be added to the spore medium during conversion as well as a small amount (e.g. 0.5%) of glucose. These modifications can aid in the rapid and complete conversion of the steroids, but when glucose is used it is important to have the medium free from available nitrogen to prevent germination.

In a similar manner to that described above spores free from mycelium and nutrient medium can be obtained from various organisms and can be used to introduce various groups into various steroid molecules. In place of the organisms, disclosed in the references noted below, which are used to introduce a group into a steroid molecule by fermentation of a vegetative inoculum in an aqueous nutrient medium, the spores per se of the same organism, free from mycelium and nutrients can be used as such to introduce the same group into the same steroid molecule.

The following microbial modifications of steroids are illustrative.

(1) Reduction of progesterone to $\Delta^4$-pregnene-20β-ol-3-one with *Streptomyces lavendulae*. Fried, J., et al., J. Am. Chem. Soc. 75:5764 (1953).

(2) Dehydrogenation of secondary alcohols:

(a) $\Delta^5$-androstene-3β,17β-diol to testosterone with *Proactinomyces erythropolis*. Turfitt, G. E., Biochem. J. 40:79 (1946).

(b) Estradiol to estrone with *Streptomyces albus*. Welsch, M., et al., Compt. rend., soc. biol. 142:1074 (1948).

(3) Hydroxylation in position 1: $\Delta^4$-androstene-3,17-dione to $\Delta^4$-androstene-1α-ol-3,17-dione with *Penicillium sp.*, Dodson, R. M., et al., J. Am. Chem. Soc. 79:3921 (1957).

(4) Hydroxylation in position 2: $\Delta^4$-pregnene-17α,21-diol-3,20-dione to $\Delta^4$-pregnene-2β,17α,21-triol-3,20-dione with Streptomyces sp., Herzog, H. L., et al., J. Am. Chem. Soc. 79:3922 1957).

(5) Hydroxylation in position 6: Progesterone to $\Delta^4$-pregnene-6β-ol-3,20-dione with *Streptomyces aureofaciens*. Fried, J., et al., Recent Progr. Hormone Res. 11:157 (1955). See also Dulaney, E. L., et al., Mycologia 47:464 (1955); Fried, J., et al., J. Am. Chem. Soc. 74:3962 (1952); Meister, P. D., et al., J. Am. Chem. Soc. 75:416 (1953) and Eppstein, S. H., et al., J. Am. Chem. Soc. 75:408 (1953) involving the microorganisms *Aspergillus ochraceus, Aspergillus niger,* and *Rhizopus arrhizus*.

(6) Hydroxylation in position 7: Progesterone to $\Delta^4$-pregnene-7α-ol-3,20-dione with *Phycomyces blakesleeanus*. Fried et al., U.S. Patent 2,753,290. See also Meystre, C., et al., Helv. Chim. Acta 38:381 (1955), using a species of Peziza for a similar type reaction on deoxycorticosterone.

(7) Hydroxylation in positions 10, 11 or 12:

(a) 19-nor-progesterone to 10ε-hydroxyl-19-norprogesterone with *Rhizopus nigricans*. Pederson, R. L., et al., J. Am. Chem. Soc. 78:1512 (1956).

(b) Progesterone to $\Delta^4$-pregnene-11α-ol-3,20-dione with *Rhizopus arrhizus*. Peterson, D. H., et al., J. Am. Chem. Soc. 74:1871 (1952). See also Peterson, D. H., et al., J. Am. Chem. Soc. 75:412 (1953).

(c) Reichstein's compound S ($\Delta^4$-pregnene-17α,21-diol-3,20-dione) to hydrocortisone ($\Delta^4$-pregnene-11β,17α,21-triol-3,20-dione) with *Cunninghamella blakesleeana*. Hanson, F. R., et al., J. Am. Chem. Soc. 75:5369 (1953). See also Shull, G. M., et al., J. Am. Chem. Soc. 77:763 (1955), and Thoma et al. U.S. Patent 2,793,162 involving similar reactions with *Curvularia lunata, Trichothecium roseum,* and *Coniothyrium hellebori*.

(d) Progesterone to $\Delta^4$-pregnene-12β-ol-3,20-dione and the related 12β,15β-diol with *Calonectria decora*. Schubert, A., et al., Ber. 90, 2576 (1957).

8. Hydroxylation in other positions are described in Meister, P. D., et al., Absts. 123rd meeting Am. Chem. Soc. (1953); Fried et al., U.S. Patent 2,753,290; Camerino, B., et al., Gazz. Chim. ital., 86:1226 (1956); Meystre, C., et al., Helv. Chim. Acta 38:381 (1955); Perlman, D., et al., J. Am. Chem. Soc. 74:2126 (1952); Thoma, R. W., et al., J. Am. Chem. Soc. 79:4818 (1957); Dulaney, E. L., et al., Appl. Microbiol. 3:372 (1955); Meystre, C., et al., Helv. Chim. Acta 37:1548 (1954); McAleer, W. J., et al., Arch. Biochem. Biophys. 62:109 (1956).

9. Dehydrogenation: Hydrocortisone to $\Delta'$-4-pregnadiene-11β,17α,21 - triol - 3,20-dione with *Streptomyces lavendulae*. Fried et al., U.S. Patent 2,793,164. See also Mobile, A., et al., J. Am. Chem. Soc. 77:4184 (1955); Vischer, E., et al., Helv. Chim. Acta 38:835 (1955).

10. Side chain degradation: Progesterone to $\Delta'$-4-androstadiene-3,20-dione with *Streptomyces lavendulae*. Peterson, G. E., et al., J. Bact. 74:684 (1957). See also Vischer, E., et al., Experienta 9:371 (1953); Turfitt, G. E., Biochem. J. 42:376 (1948).

See also U.S. Patents 2,602,769; 2,649,400; 2,649,401; 2,649,402; 2,695,260; 2,735,800; 2,753,290; 2,762,747; 2,768,928; 2,789,940; 2,802,775; 2,809,919; 2,812,285; and 2,830,937 which involve microorganisms forming spores which can be used in a vegetative growth nutrient-free medium in the described processes.

As noted above, the processes are carried out in accordance with the processes described in the references except (1) that the vegetative growth material employed in the reference process is replaced by spores of the organism substantially free from vegetative growth material and (2) that the aqueous nutrient fermentation medium employed in the reference process is replaced by a substantially nutrient-free aqueous medium. The time required to complete the conversion with spores (and which can be readily ascertained by preliminary tests in each case) is usually materially shortened and the yield materially increased over that using prior processes. Aside from the time element, however, the recovery of the modified chemical in good yield (which, here again, can be carried out in accordance with the reference process) is much easier from the relatively clean reaction mixture of the present invention than the prior art fermentation mixtures containing vegetative growth, organic nutrients, by-products of the same, etc. Purification of the modified compound after isolation is also much easier in the process of the present invention than is possible from the highly contaminated mixtures used in the prior art processes.

It will be apparent from the above that the process of the present invention using spores as the sole oxygenating source can be used in any place where mycelium and beer produced by oxygenating organisms have been used heretofore. The use of a steroid with an eleven methylene group and spores obtained from Aspergillus (see Murray et al. Patent 2,649,402) and Penicillium (see Murray et al. Patent 2,649,400) are illustrative and of the type preferred.

Two interconversions can be brought about simultaneously by using spores of different fungi; the difference may be as little as difference in strains of the same fungus or as great as a difference in class. Furthermore, the difference may be induced by mutation of a particular organism.

I claim:

1. In the microbiological conversion of steroids by mold spores produced with vegetative growth material during fermentation in a nutrient medium, the improvement which consists in carrying out the conversion with the spores in a substantially vegetative growth material-free, nutrient-free aqueous medium in which the spores cannot germinate.

2. In the microbiological conversion of steroids by mold spores produced with mycelium and beer during fermentation in an aqueous nutrient medium, the improvement which consists in separating the spores from the mycelium and beer, washing the separated spores with water, and then carrying out the conversion in an aqueous medium in which the spores cannot germinate consisting essentially of the washed spores and the steroid.

3. A process for the production of an oxygenated steroid comprising the steps of aerobically growing a culture of an oxygenating strain of a mold in a nutrient medium to produce spores, separating the spores from the nutrient medium including the resulting mycelium and growth by-products produced during the growth period and present in the growth culture, and exposing a steroid to the oxygenating activity of the separated spores produced by said culture in a medium in which the spores cannot germinate.

4. A process in accordance with claim 3 for the production of 11-α-hydroxy steroids, which consists in subjecting a steroid having an eleven methylene group to the action of spores produced by an oxygenating strain of *A. ochraceus*.

5. The process which comprises producing spores by growing *A. ochraceus* on a nutrient medium containing assimilable carbon and nitrogen for about 4–6 days, separating the spores from the mycelium produced during the growing period, washing the spores with water, suspending the resulting clean spores in an aqueous medium in which the spores cannot germinate, adding progesterone to the spore suspension, aerating the mixture and recovering the resulting 11-α-hydroxyprogesterone.

6. In the microbiological conversion of steroids by oxygenating enzymes produced with spores, mycelium and beer by the fermentation of an oxygenating strain of a mold in a nutrient medium, the improvement which consists in separating the spores from the nutrient medium including the mycelium and beer, and exposing the steroid to the oxygenating activity of the spores in a medium in which the spores cannot germinate.

7. In the microbiological conversion of a steroid by culturing of a spore-forming mold in a nutrient culture medium containing the steroid, the improvement which comprises first producing spores by culturing the mold in a nutrient medium, separating the spores from the resulting culture medium, washing the spores to remove culture nutrient and vegetative growth material produced during the culturing of the mold, and dispersing the steroid in the form of fine particles in an aqueous suspension of the washed spores in which the spores cannot germinate.

References Cited in the file of this patent

UNITED STATES PATENTS

| 2,831,798 | McAleer et al. | Apr. 22, 1958 |
| 2,861,088 | Murray et al. | Nov. 18, 1958 |

OTHER REFERENCES

Peterson et al.: Jour. Am. Chem. Soc., 74, 5933–5936 (1952).

Dulaney et al.: Appl. Microbiol., 3: 336–340 (1955).